(12) United States Patent
Grupp et al.

(10) Patent No.: US 10,508,895 B2
(45) Date of Patent: Dec. 17, 2019

(54) METHOD FOR SINGLE-POINT SCANNING OF A WORKPIECE AND COORDINATE MEASURING MACHINE

(71) Applicant: CARL ZEISS INDUSTRIELLE MESSTECHNIK GMBH, Oberkocken (DE)

(72) Inventors: Guenter Grupp, Boehmenkirch (DE); Otto Ruck, Pfahlheim (DE); Eugen Aubele, Boehmenkirch (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 372 days.

(21) Appl. No.: 15/437,983

(22) Filed: Feb. 21, 2017

(65) Prior Publication Data
US 2017/0160066 A1 Jun. 8, 2017

Related U.S. Application Data

(63) Continuation of application No. PCT/EP2015/069133, filed on Aug. 20, 2015.

(30) Foreign Application Priority Data

Aug. 28, 2014 (DE) .......................... 10 2014 112 396

(51) Int. Cl.
*G01B 5/008* (2006.01)
*G01B 21/04* (2006.01)

(52) U.S. Cl.
CPC ............. *G01B 5/008* (2013.01); *G01B 21/04* (2013.01)

(58) Field of Classification Search
CPC ....... G01B 5/008; G01B 21/042; G01B 21/04
(Continued)

(56) References Cited

U.S. PATENT DOCUMENTS 8,627,576 B2 * 1/2014 Engel .................... G01B 21/047
33/503
9,482,524 B2 11/2016 Metzler et al.
(Continued)

FOREIGN PATENT DOCUMENTS

CN 102686974 A 9/2012
DE 295 04 239 U1 6/1995
(Continued)

OTHER PUBLICATIONS

English translation of International Preliminary Report on Patentability (Chapter II) for PCT/EP2015/069133; dated Apr. 6, 2017; 14 pp.
(Continued)

*Primary Examiner* — Christopher W Fulton
(74) *Attorney, Agent, or Firm* — Harness, Dickey & Pierce, P.L.C.

(57) ABSTRACT

The present invention relates to a method for single-point probing of a workpiece by means of a sensor, in particular a tactile sensor, of a coordinate measuring machine, comprising the steps of providing a variable at least indirectly representing a required accuracy of the single-point probing, providing a parameter data set, wherein the parameter data set has prescriptions for regulating and/or evaluating the single-point probing with the required accuracy, and carrying out the single-point probing of the workpiece, wherein the coordinate measuring machine is regulated on the basis of the provided parameter data set and/or an evaluation is carried out on the basis of the provided parameter data set. Furthermore, a coordinate measuring machine for single-point probing of a workpiece is proposed.

24 Claims, 5 Drawing Sheets

(58) Field of Classification Search
USPC .......................................................... 33/503
See application file for complete search history.

(56) References Cited

U.S. PATENT DOCUMENTS

| | | | | |
|---|---|---|---|---|
| 2005/0263727 | A1* | 12/2005 | Noda | G01B 5/008 250/559.29 |
| 2008/0033690 | A1* | 2/2008 | Grupp | G01B 21/042 702/152 |
| 2014/0211191 | A1 | 7/2014 | Jensen et al. | |
| 2015/0204653 | A1* | 7/2015 | Przygodda | G01B 21/045 33/503 |
| 2016/0341533 | A1* | 11/2016 | Noda | G01B 5/008 |
| 2016/0364869 | A1* | 12/2016 | Siercks | B25J 9/1666 |
| 2017/0138726 | A1* | 5/2017 | Roithmeier | G05B 19/401 |
| 2017/0370689 | A1* | 12/2017 | Hemmings | G01B 21/045 |

FOREIGN PATENT DOCUMENTS

| | | | |
|---|---|---|---|
| DE | 296 03 273 U1 | 5/1996 | |
| EP | 0858015 A1 * | 8/1998 | ........... G01B 21/045 |
| EP | 2 511 656 A1 | 4/2011 | |
| EP | 2 735 843 A1 | 5/2014 | |
| EP | 2 762 832 A1 | 8/2014 | |
| WO | WO 88/09915 A1 | 12/1988 | |
| WO | WO 2004/027697 A2 | 4/2004 | |
| WO | WO-2016030268 A1 * | 3/2016 | ............. G01B 21/04 |

OTHER PUBLICATIONS

Chinese Examination Report with Search Report (English translation included) for CN Application No. 201580052491.7; dated Dec. 5, 2018; 16 pp.

Din En Iso 10360-2; Geometrical product specifications (GPS)—Acceptance and reverification tests for coordinate measuring machines (CMM)—Part 2: CMMs used for measuring linear dimensions (ISO 10360-2:2009); Jun. 2010; 37 pp.

German Examination Report (with English translation) for Appl'n No. 10 2014 112 396.4; dated May 5, 2015; 13 pp.

International Search Report for PCT/EP2015/069133; dated Nov. 2015; 12 pp.

German language International Preliminary Report on Patentability (Chapter II) (with English language translation); 37 pp. dated Nov. 14, 2015.

* cited by examiner

METHOD FOR SINGLE-POINT SCANNING OF A WORKPIECE AND COORDINATE MEASURING MACHINE

CROSS-REFERENCE TO RELATED APPLICATIONS

This is a Continuation application of International patent application PCT/EP2015/069133, filed Aug. 20, 2015, which claims the priority of German patent application DE 10 2014 112 396.4, filed Aug. 28, 2014. The entire content of both prior applications is herewith incorporated by reference.

BACKGROUND OF THE INVENTION

The present invention relates to a method for single-point probing of a workpiece by means of a sensor, in particular a tactile sensor, of a coordinate measuring machine. Furthermore, the present invention relates to a coordinate measuring machine for single-point probing of a workpiece.

Coordinate measuring machines are common in the prior art. A coordinate measuring machine is a machine comprising a measuring head which may be displaced relative to an object to be measured in a measurement volume. The measuring head is brought into a defined position relative to a measurement point at the object to be measured. The measurement point is probed in the case of tactile coordinate measuring machines, for example by means of a stylus arranged at the measuring head. Subsequently, spatial coordinates of the measurement point may be determined on the basis of the known position of the measuring head in the measurement volume. If the spatial coordinates of a plurality of defined measurement points are determined at an object to be measured, it is moreover possible to determine geometric dimensions or even the spatial form of the object to be measured. They serve for checking workpieces, for example as part of quality assurance, or for ascertaining the geometry of a workpiece completely as part of what is known as "reverse engineering." Moreover, multifarious further application possibilities are conceivable.

In coordinate measuring machines of this type, different types of sensors may be used to capture the coordinates of a workpiece to be measured. By way of example, sensors that measure in tactile fashion are known in this respect, as are sold, for example, by the applicant under the name "VAST", "VAST XT" or "VAST XXT." Here, the surface of the workpiece to be measured is probed with a stylus, the coordinates of said stylus in the measurement space being known at all times. This probing may be carried out within the scope of single-point probing, in which each point to be measured on the workpiece is approached individually. For each single point, the stylus is brought into contact with the workpiece and subsequently lifted off the workpiece again. Such a stylus may be moved along the surface of a workpiece while it remains in contact with the workpiece, and so a multiplicity of measurement points may be captured at set time intervals during such a measuring process within the scope of a so-called "scanning method".

It is moreover known to use optical sensors that facilitate contactless capturing of the coordinates of a workpiece. One example of such an optical sensor is the optical sensor sold by the applicant under the name "ViScan".

The sensors may also be used in different types of mixed tactile and optical measuring constructions. Merely, one example of such a measurement construction is the product "O-INSPECT" by the applicant. In an appliance of this type, both an optical sensor and a tactile sensor are used to carry out various examination tasks on a machine and ideally with a single setup of a workpiece to be measured. In this way it is possible to easily carry out many examination tasks, for example in medical engineering, plastics technology, electronics and precision engineering. Various other constructions are, of course, also conceivable.

Conventionally, the sensor head is connected to a carrier structure or machine frame, which supports and moves the sensor system. The prior art has disclosed various carrier structures, for example portal systems, stand systems, horizontal arm systems and arm systems, all types of robotic systems and ultimately closed CT systems in the case of sensor systems operating with x-rays. Here, the carrier structures may moreover comprise system components which facilitate a positioning of the sensor head which is as flexible as possible. An example for this is the rotate-swivel-articulation from the applicant sold under the name "RDS". Moreover, various adapters for connecting the various system components of the carrier structure among themselves and with the sensor system may be provided.

Coordinate measuring machines comprise a displaceable sensor head. In a coordinate measuring machine which underlies the following in an exemplary manner, the head is often fastened to the lower free end of a vertically arranged quill. The quill is displaceable such that the measuring head may be displaced perpendicular to a measuring table. The measuring table serves to receive an object to be measured. The quill in turn is arranged in a carriage on a crossbeam of a portal and it may be displaced in a first horizontal direction on the crossbeam by means of a carriage. Together with the quill, the portal may be displaced in a second horizontal direction, and so, overall, the measuring head may be displaced in three mutually perpendicular spatial directions. Here, the quill, the carriage and the portal form a machine frame. By way of example, the types of coordinate measuring machines sold by the applicant under the name "PRISMO", "ACCURA" or "CenterMax" comprise examples of such machine frames. The maximum travels of the measurement head along the three movement directions determine a measurement space, within which spatial coordinates may be determined on an object to be measured.

In coordinate measuring machines which are used e.g. within the scope of quality assurance, the time duration or measurement time required to measure a workpiece is often an important parameter. A measurement time which is longer by even only fractions of a second may have a great disadvantage in the case of a multiplicity of workpieces to be examined. In this respect, attempts are made to carry out the measurements as quickly as possible or to keep the measurement time short. However, the speed of a measurement is often dependent on the accuracy of the measurement. Naturally, certain measurements are subject to accuracy requirements which should be strictly adhered to. As a rule, a measurement with a higher accuracy requires a longer period of time, and vice versa.

Hence, there have been deliberations in the prior art relating to bringing the time duration required for measuring a workpiece in line with the accuracy requirements.

Thus, documents DE 296 03 273 U1 and DE 295 04 239 U1 each disclose a coordinate measuring machine comprising a measuring contact probe for scanning the workpiece surface to be measured, motor-driven drives for the mobile measuring carriages of the coordinate measuring machine, by means of which the contact probe is guided, control electronics connected to the drives, a computer with monitor and input and output means for operating the coordinate measuring machine and for evaluating the measurement results, with the controller allowing different control parameters to be set, in particular allowing different measurement speeds of the drives to be set, wherein the input means are prepared for selecting different measuring problems and wherein the computer contains a memory in which control parameters appropriate to selectable measuring problems are stored.

Moreover, document WO 88/09915 A1 proposes a method for measuring nominally identical workpieces by means of a coordinate measuring machine. A workpiece should be measured at a low speed in order to facilitate measuring most of the workpieces at a high speed and to compensate the errors caused thereby. A series of error values for the differences between the slow measurement and the fast measurement is calculated for this workpiece. Subsequent fast measurements of successive workpieces are then corrected using these error values.

However, for single-point measurements by means of sensors, in particular by means of tactile sensors or else by means of optical sensors, so-called single-point probing, there still is a lack of reliable methods and coordinate measuring machines which carry out single-point measurements in an optimized manner, taking into account predetermined accuracy requirements, in particular in an optimized manner in respect of a time duration or measurement time that is as short as possible.

It is therefore an object of the present invention to remove the aforementioned disadvantages and provide a method and a coordinate measuring machine for single-point probing by means of sensors, in particular tactile sensors, which are able to handle different accuracy requirements.

BRIEF SUMMARY OF THE INVENTION

According to a first aspect of the invention, a method for single-point probing of a workpiece by means of a sensor, in particular a tactile sensor, of a coordinate measuring machine is therefore provided, said method comprising the steps of providing a variable representing a required accuracy of the single-point probing and/or at least indirectly representing a required accuracy of the single-point probing, providing a parameter data set, wherein the parameter data set has prescriptions for regulating and/or evaluating the single-point probing with the required accuracy, and carrying out the single-point probing of the workpiece, wherein the coordinate measuring machine is regulated on the basis of the provided parameter data set and/or an evaluation is carried out on the basis of the provided parameter data set.

According to a further aspect, a coordinate measuring machine for single-point probing of a workpiece, comprising a sensor, in particular a tactile sensor, a carrier structure for holding the sensor and moving the sensor within a measurement space of the coordinate measuring machine, a regulating device for regulating single-point probing of the workpiece by means of the sensor, in particular the tactile sensor, on the basis of a parameter data set, wherein the parameter data set has prescriptions for regulating and/or evaluating the single-point probing with a required accuracy, an input device for inputting a variable representing the required accuracy of the single-point probing and/or at least indirectly representing the required accuracy of the single-point probing and comprising a data processing device, is provided, said data processing device providing the parameter data set dependent on the variable representing the required accuracy of the single-point probing. The data processing device may moreover be provided for evaluating the single point probing. In particular, the data processing device is embodied and configured to evaluate the single-point probing.

According to a further aspect, a method for single-point probing of a workpiece by means of a sensor of a coordinate measuring machine is provided, said method comprising the steps of providing a variable at least indirectly representing a required accuracy of the single-point probing; providing a parameter data set, wherein the parameter data set has prescriptions for regulating and/or evaluating the single-point probing with the required accuracy, wherein the sensor is a measuring sensor, wherein each individual point of probing is determined by forming a moving average over a probing time interval, wherein the parameter data set comprises at least one parameter of forming the moving average, and wherein the at least one parameter of forming a moving average is a duration of the probing time interval, a weighting of the measurement values captured during the probing time interval and/or an accuracy of forming the moving average; and carrying out the single-point probing of the workpiece, wherein the coordinate measuring machine is regulated on the basis of the provided parameter data set and/or an evaluation is carried out on the basis of the provided parameter data set.

According to a further aspect, a coordinate measuring machine for single-point probing of a workpiece is provided, comprising a measuring sensor a carrier structure for holding the sensor and moving the sensor within a measurement space of the coordinate measuring machine, a regulating device for regulating single-point probing of the workpiece by means of the sensor on the basis of a parameter data set, wherein the parameter data set contains prescriptions for regulating and/or evaluating the single-point probing with a required accuracy, an input device for inputting a variable representing the required accuracy of the single-point probing and a data processing device which provides the parameter data set dependent on the variable representing the required accuracy of the single-point probing, wherein each individual point of probing is determined by forming a moving average over a probing time interval, and wherein the parameter data set comprises at least one parameter of forming the moving average, and wherein the at least one parameter of forming a moving average is a duration of the probing time interval, a weighting of the measurement values captured during the probing time interval and/or an accuracy of forming the moving average.

In this way, it becomes possible to provide single-point probing by selecting a desired accuracy. As it were, a "matched single-point measurement" is carried out. In particular, provision may be made for the required accuracy to be provided by an input in the form of a multiple of the volumetric length measurement deviation MPE-E. The terminology and tests for verifying this variable for coordinate measuring machines, applied to length measurements, are explained, for example in DIN EN ISO 10360-2:2010-06, and are known in principle by a person of average skill in the art.

It may be particularly advantageous, as a matter of principle, not to immediately set the measurement accuracy for all instances of single-point probing but to impart an individually required accuracy on each single point and thus measure each feature on the workpiece with the ideal or fastest possible speed in accordance with the individual tolerance limits.

Here, the term "single-point probing" does not relate exclusively to mechanical single-point probing. This may relate to mechanical or optical single-point probing. By way of example, the term "single-point probing" may also be replaced by "single-point measurement" or "single-point capture". Preferably, the sensor is a tactile sensor. However, provision may also be made of an optical sensor. The optical sensor may be configured in such a way that although there is mechanical single-point probing of the workpiece, for example by means of a stylus or another sensing element, the location of this mechanical probing is captured by means of an optical sensor. However, provision may also be made of an optical sensor or purely optical sensor which undertakes optical single-point probing at the workpiece, for example by means of a triangulation method.

If the user now selects a lower accuracy or a tolerated multiple of the MPE-E, it is possible to obtain a measurement time reduction during single-point probing. This in turn leads to higher part throughput per hour and hence makes the coordinate measuring machine even more effective. So that the measurement process remains replicable in the case of single-point measurements or single-point probing with different accuracy prescriptions or differently set multiples of the MPE-E, the required accuracy should, in particular, be stored in a log of the measurement. First examinations have shown that, for example, an increase in the MPE-E by a factor of 2 or the correspondingly lower required accuracy may obtain a measurement time reduction of approximately 25%.

In one refinement of the method, provision may be made for the variable representing the required accuracy to be provided by virtue of the required accuracy being input by means of an input device of the coordinate measuring machine.

As set forth at the outset, the required accuracy of the single-point probing may, in principle, be provided by way of a variable at least indirectly representing the required accuracy. Hence, the variable may directly specify the accuracy, but it may also be a different variable from which the accuracy emerges or may be derived. This required accuracy may be input by means of an input device of the coordinate measuring machine. Accordingly, it is possible, for example, for a user interface of the coordinate measuring machine to be configured in such a way that the user is provided with the option of predetermining the required accuracy for a particular instance of single-point probing. As will still be explained below, said user may, for example, specify here a multiple of the volumetric length measurement error. A greater tolerated error means a lower accuracy. The input device may be configured by means of conventional input means, such as e.g. keyboards, mouse input appliances, trackballs, etc. Touchscreens or voice inputs are also conceivable. However, in principle provision may also be made for the provision of the required accuracy to be brought about in a different manner. By way of example, the required accuracy may be transferred to the coordinate measuring machine in the form of a file or a data set, which is linked with a corresponding workpiece. By way of example, to this end, said coordinate measuring machine may be connected to a wired or wireless network. The required accuracy may also be determined in an automated fashion, for example on the basis of CAD data of the workpiece and/or a measurement task.

Furthermore, provision may be made in one refinement for a variable representing the required accuracy to be a characteristic specifying the accuracy of the coordinate measuring machine. In this manner, the required accuracy may be input directly in the form of an accuracy.

By way of example, provision may be made in a further refinement for the variable to be a multiple of the maximum permissible error during a length measurement, abbreviated MPE-E. Said error is also referred to as volumetric length measurement error. Here, MPE denotes "Maximum Permissible Error". Here, the addition "-E" specifies the volumetric length measurement error. Moreover, there is, for example, the volumetric probing deviation MPE-P. Moreover, there is, for example, the multiple sensing device probing deviation MF, MS or ML.

In a further refinement of the method, provision may be made for the variable to be a variable indirectly specifying the required accuracy and wherein the required accuracy is determined from the variable indirectly specifying the required accuracy. In particular, the variable indirectly specifying the required accuracy may be a position of the point to be probed on the workpiece or, for example, a measurement task. By way of example, such a measurement task may be the measurement of a length, a diameter or a depth, a circle or a bore, a dimension or, for example, a form of the workpiece. The measurement tasks are composed of a plurality of instances of single-point probing such that one or more selected instances of single-point probing may be carried out with a lower accuracy where necessary. The position of a point on the workpiece may also be accompanied by different accuracy requirements. By way of example, various points on a workpiece may be probed with different accuracies.

In a further refinement of the method, provision may be made for a provision range to be predetermined, within which the required accuracy is providable. In particular, the provision range may be provided dependent on a carrier structure of the coordinate measuring machine and/or a type of sensor, in particular a type of tactile sensor.

This provision range may limit the accuracies within which operation may be carried out. This may be dependent on the employed carrier structure, for example a portal construction, a horizontal arm, etc., or else dependent on the type of sensor, in particular the type of tactile sensor, for example whether this relates to a single sensing device, which merely comprises a single stylus and single probe sphere, or else a multiple sensing device. In certain circumstances, it may be the case that no meaningful measurement results may be obtained any more within accuracy requirements that are too low if use is made of specific carrier structures and/or types of sensor, in particular types of tactile sensor. This may be avoided using a provision range determined in advance.

In a further refinement of the method, provision may be made for the parameter data set to be provided for a shortest time duration of the single-point probing with the required accuracy.

Therefore, the parameter data set is optimized in such a way that, with the required accuracy, the time duration for the single-point probing is minimized. As a rule, this is carried out using the required accuracy. Then, a lower required accuracy or a greater permitted measurement error for example facilitates higher speeds and/or accelerations, and so the overall time duration for single-point probing may be reduced.

In a further refinement of the method, provision may be made for the parameter data set to be provided dependent on a product type and/or a type of carrier structure of the coordinate measuring machine.

By way of example, a product type of the coordinate measuring machine may specify the product series, e.g. "Accura", "Prismo" or "CenterMax". Alternatively, or cumulatively, the parameter data set may moreover be provided in a manner dependent on the type of carrier structure of the coordinate measuring machine, i.e., for example, portal construction, horizontal arm, table construction, etc. Naturally, the type of carrier structure may go hand-in-hand with the product type of the coordinate measuring machine. It is understood that different carrier structures require different parameters, for example in respect of permitted speeds and permitted accelerations when moving the contact probe, in order to observe the required accuracy. Consequently, parameter data sets may be stored dependent on a product type and/or a type of carrier structure of the coordinate measuring machine.

In a further refinement, provision may be made for the parameter data set to be provided dependent on an installation size of the coordinate measuring machine and/or the dimensions of a measurement space of the coordinate measuring machine.

As a rule, coordinate measuring machines with a smaller installation size and, accompanying this, a smaller measurement space facilitate higher accuracies. In particular, this is due to the carrier structure being subject to fewer deformations. Consequently, in this case too, different installation sizes or dimensions of a measurement space of the coordinate measuring machine require different parameter data sets or adapted parameter data sets such that these may be provided dependent on installation size and/or dimension of a measurement space.

In a further refinement, provision may be made for the parameter data set to comprise a speed and/or an acceleration of a movement of the sensor, in particular of the tactile sensor, of the coordinate measuring machine.

In particular these parameters of speed and/or acceleration may substantially reduce the time duration for carrying out single-point probing. Provision may therefore be made in particular for the parameter set to have e.g. limit values for a maximum permissible speed and/or acceleration, which the coordinate measuring machine may then use within the scope of single-point probing.

In a further refinement, provision may be made for the parameter data set to comprise at least one probing parameter for the tactile sensor. The probing parameter may be a probing search path, a probing speed, an acceleration during probing, a scan path for a measuring tactile sensor and/or a scan path for a switching tactile sensor. Here, the term "scan path" denotes the path which the sensor, in particular the tactile sensor, travels once probing and measurement data capture have been completed, in particular in the case of manually controlled probing. Further possible probing parameters include, for example, the speed during probing, an application of measurement force during probing, an acceleration when traveling the scan path and/or a speed when traveling the scan path.

In a further refinement of the method, provision may be made for the sensor, in particular the tactile sensor, to be a measuring sensor, in particular a measuring tactile sensor, wherein each individual point of probing is determined by forming a moving average over a probing time interval, and wherein the parameter data set comprises at least one parameter of forming the moving average, in particular wherein the at least one parameter of forming a moving average is a duration of the probing time interval, a weighting of the measurement values captured during the probing time interval and/or an accuracy of forming the moving average. The weighting may be linear or exponential. In particular, more current measurement values may be weighted more strongly. The mathematical basis of "forming a moving average" or of a "moving average" are known to a person of average skill in the art. By way of example, in respect of the accuracy or the desired accuracy of the moving average, averaging may be carried out until the average only still changes by an adjustable value within an adjustable period of time, i.e. averaging is only stopped once the moving average is situated within the set "window" and the last average is output as measurement value. This setting of a window may be a simple way to save time in the case of relatively large permissible tolerances.

In the case of measuring tactile sensors, a single measurement point is probed over a certain period of time within the scope of single-point probing. The measuring sensor, in particular the measuring tactile sensor, records measurement values at a specific rate. Accordingly, forming a moving average takes into account a certain number n of earlier measurement values when forming an average. A newly ascertained measurement value is always added, and the respective oldest measurement value is eliminated from the forming of the average. Here, the measuring sensor, in particular the measuring tactile sensor, is left in contact with the point to be measured over a certain probing period of time until the mean value only still changes to a very small extent. By way of example, this extent may be expressed in the form of a percentage specification of the preceding moving average. By way of example, the entire measurement process may be accelerated with reduced accuracy by a fundamental reduction in the probing period of time. However, it is also possible, for example, to change the weighting of the measurement values. It is naturally also possible to modify a specified value in respect of the change in average, from which the system is considered to be "settled" and the average is considered to be constant.

In a further refinement of the method, provision may be for a calibration of the sensor, in particular of the tactile sensor, and/or of a stylus of a tactile sensor to be carried out prior to the step of providing a variable at least indirectly representing the required accuracy of the single-point probing, and wherein the calibration is carried out with a calibration parameter data set which provides the best accuracy of the coordinate measuring machine, in particular a simple MPE-E, and in particular wherein the resilience of a stylus of a tactile sensor, determined during the calibration, is used when carrying out the single-point probing and/or evaluating the single-point probing.

In this way, it is possible to initially undertake a calibration of the coordinate measuring machine with a very high accuracy in order to ascertain calibration values, for example rigidity matrices or tensors, which are as reliable as possible. These calibration data obtained with a high accuracy may then subsequently be used when single-point probing or the instances of single-point probing are driven with a lower accuracy.

Provision may be made for the sensor to be a tactile sensor in all refinements of the method and/or in all refinements of the coordinate measuring machine. The tactile sensor may be a switching tactile sensor or a measuring tactile sensor. Provision may also be made of an optical sensor or any other sensor for single-point probing. Here, an optical sensor may be configured in such a way that although there is mechanical single-point probing of the workpiece, for example by means of a stylus or another sensing element, the location of this mechanical probing is captured by means of an optical sensor. However, provision may also be made of an optical sensor or purely optical sensor which undertakes optical single-point probing at the workpiece, for example by means of a triangulation method.

The method and/or the coordinate measuring machine may be operated with a measuring sensor or a switching sensor.

It is understood that the aforementioned features and those yet to be explained below may be used not only in the respectively specified combination but also in other combinations or on their own, without departing from the scope of the present invention.

BRIEF DESCRIPTION OF THE DRAWINGS

Embodiments of the invention are depicted in the drawing and explained in more detail in the following description. In the figures.

DETAILED DESCRIPTION OF THE INVENTION

Figure 1:
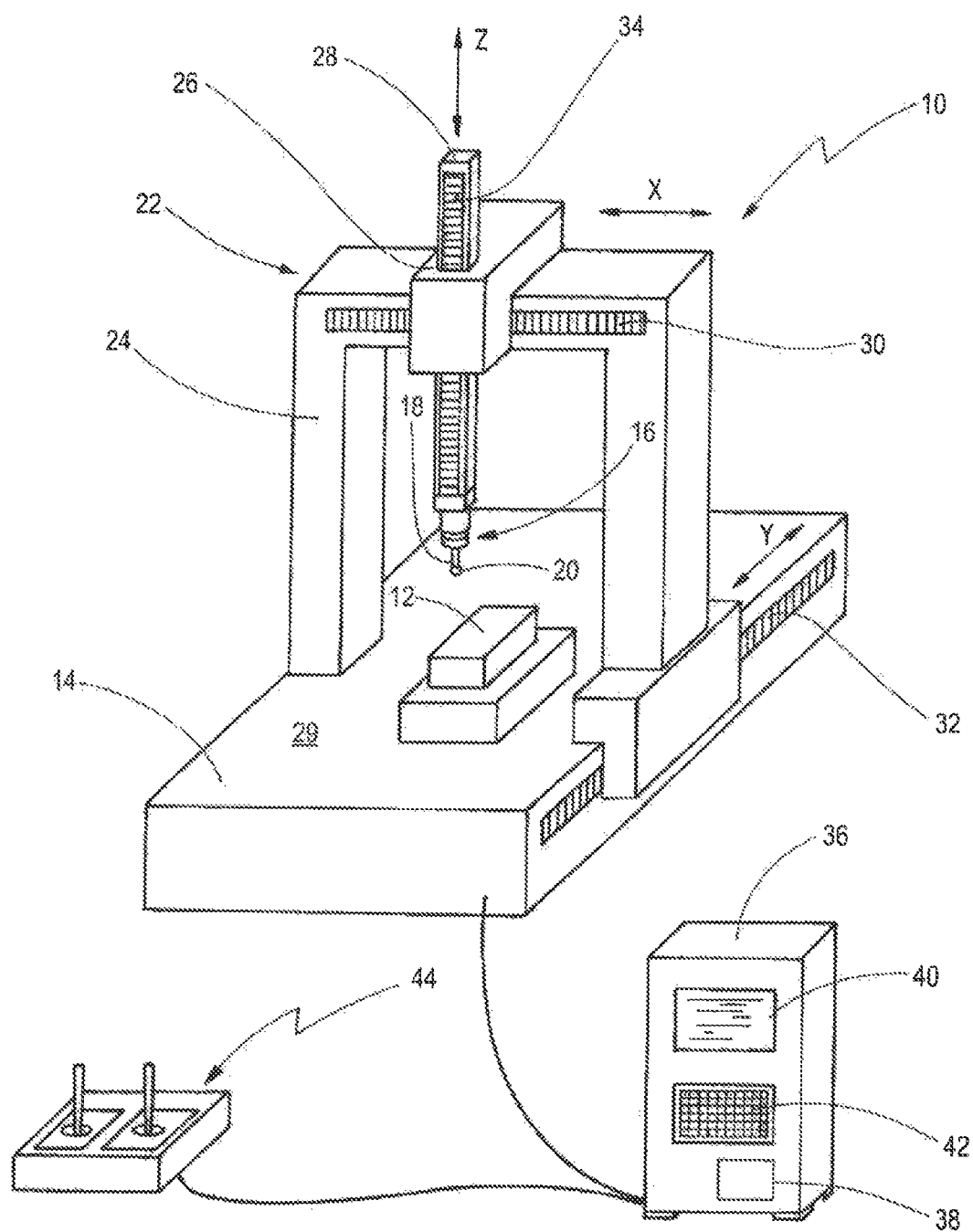
FIG. 1 shows an embodiment of a coordinate measuring machine.

FIG. 1 shows an embodiment of a coordinate measuring machine 10. The coordinate measuring machine 10 serves to measure a workpiece 12. The workpiece 12 is arranged on a base plate 14 of the coordinate measuring machine 10. By way of example, the base plate may be made of granite. A sensor 16, in particular a tactile sensor, serves to measure the workpiece 12. In the depicted embodiment, the sensor is a tactile sensor 16 comprising a stylus 18 with a probe sphere 20. However, in principle, the tactile sensor 16 may also comprise a multiple sensing device comprising a plurality of sensing elements, for example a plurality of probe spheres which are arranged with a certain angular relationship to one another, for example 90 degrees in each case. Such a "fir tree arrangement" is well known to a person of average skill in the art. Provision may also be made of other sensing elements than the probe sphere 20, for example prisms or the like.

The coordinate measuring machine 10 comprises a carrier structure 22. The carrier structure is provided as a portal construction in the depicted embodiment. However, as a matter of principle, other carrier structures are also conceivable. The carrier structure 22 comprises a portal 24 which is movable relative to the base plate 14 in a Y-direction. Moreover, provision is made of a carriage 26, which is movable relative to the portal in an X-direction. The Y-direction extends perpendicular to the Y-direction. A quill 28, which is movable in a Z-direction, is arranged in the carriage 26. The Z-direction is perpendicular to the X-direction and Y-direction. The sensor is arranged at one end of the quill 28. Consequently, the sensor 16 is movable in a measurement space 29 by means of the carrier structure 22. In principle, a further element may, for example, moreover be provided between the sensor 16 and the quill, for example provision may be made for an articulation to be arranged there. The latter may facilitate rotating or swiveling of the sensor about all three spatial axes. In this way, the sensor 16 may be moved and rotated freely within the measurement space 29 such that the workpiece 12 may be probed from any spatial direction.

Scales 30, 32, 34 in the spatial directions X, Y and Z, which capture the position of the respective element, are provided at the carrier structure 22. Thus, the scale 30 captures the position of the carriage relative to the portal. The scale 32 captures the position of the portal relative to the base plate. And the scale 34 captures the position of the quill relative to the carriage. The position data captured thus may be processed further electronically. By way of example, said data may be transferred into a data processing device 36. The data processing device 36 may be embodied for controlling and regulating the coordinate measuring machine for capturing and evaluating the measurement data, for inputting commands by a user and for outputting the measurement data by way of a printer or indication apparatus. Moreover, the coordinate measuring machine comprises a regulating device 38 which regulates the coordinate measuring machine 10. In particular, said regulating device regulates the movements of the elements of the carrier structure 22, in particular of the portal 24, the carriage 26 and the quill 28. The regulating device 38 may be provided separately from the data processing device 36. However, as a matter of principle, the regulating device may also be part of the data processing device 36. The regulating device 38 may have a hardware-implemented and/or software-implemented embodiment. Moreover, the data processing device 36 comprises an indication device 40, by means of which indications may output to a user. By way of example, these may comprise the measurement results. Selection options, for example for the required accuracy, may also be indicated on the indication device 40. In principle, the indication device 40 may also be provided separately from the data processing device 36. Moreover, an input device 42 is provided in the coordinate measuring machine 10. It may likewise be separate from the data processing device 36. However, it may also be an element of the data processing device 36. By way of example, the input device 42 may be provided in the form of a keyboard, a mouse input appliance or a trackball or the like.

Moreover, a further input device 44 may be provided. By way of example, this further input device 44 may be provided for manual control of the sensor, in particular the tactile sensor, 16. In this way, manual control may also be facilitated in the coordinate measuring machine in addition to the automatically regulated movement of the sensor, in particular of the tactile sensor, 16.

Figure 2:
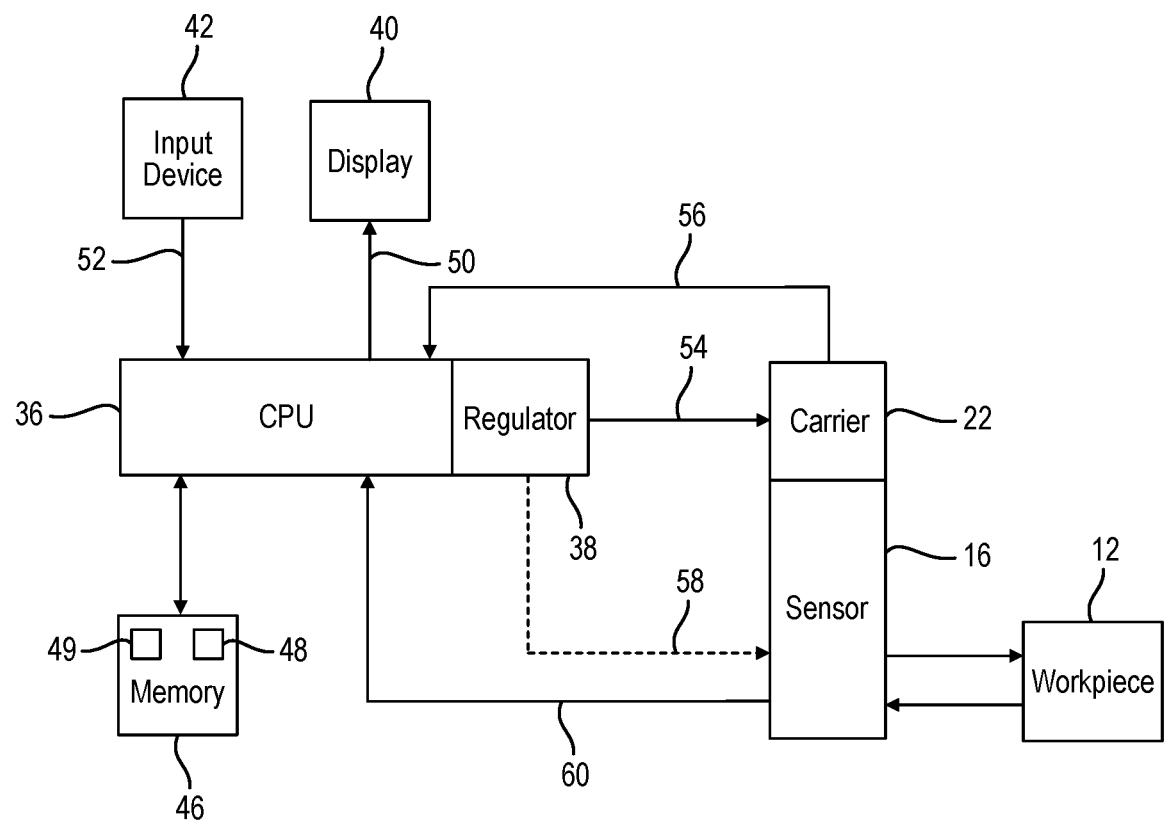
FIG. 2 shows a schematic view of the components of an embodiment of a coordinate measuring machine and the communication therebetween.

FIG. 2 shows a schematic design of a coordinate measuring machine 10 and data interchange in the coordinate measuring machine 10. Input data 52 are input into the input device 42. By way of example, a required accuracy. These are received in the data processing device 36. Then, in communication with a memory 46, in which a plurality of possible parameter data sets 48, 49 are stored, the data processing device 36 of the coordinate measuring machine 10 may provide a parameter data set which, depending on the coordinate measuring machine 10, for example the type of the carrier structure 22, selects a parameter data set 48, 49 corresponding to the required accuracy. In principle, the parameter data set 48, 49 may also be ascertained in the data processing device 36 by calculation. However, it may also be stored in the memory 46, in particular a non-volatile memory 46, for example in the form of pre-calculated tables, which may have a multi-dimensional embodiment. Output data, for example measurement results, may be output by the data processing device 36 as output data 50 to the indication device 40.

In FIG. 2, the regulating device 38 is embodied as an element of the data processing device 36, for example as a hardware-implemented regulating device 38. The selected parameter data set 48, 49 is transferred to said regulating device. By way of example, the parameter data set 48, 49 comprises all regulating parameters for regulating the carrier structure and/or the sensor, in particular the tactile sensor, 16, for example probing search paths, maximum speeds of the sensor, in particular of the tactile sensor, 16, the carrier structure or maximum accelerations of the sensor, in particular the tactile sensor, 16 or the carrier structure 22. Naturally, such values may also be provided individually for the single elements of the carrier structure 22, i.e., for example the portal 24, the carriage 26 or the quill 28.

The regulating device 38 transfers control commands 54 to the carrier structure 22 for moving the carrier structure 22 and the sensor 16. By way of example, control commands 58 may also be transferred directly to the tactile sensor 16 in the case of an actively measuring tactile sensor 16, for example in respect of an application of measurement force onto the workpiece 12. Position data 56 are returned from the carrier structure 22 to the data processing device 36 and/or the regulating device 38 by way of the scales 30, 32, 34. The sensor, in particular the tactile sensor, 16 measures the workpiece 12 and thereupon transfers measurement data 60 to the data processing device 36 and/or the regulating device 38.

Figure 3:
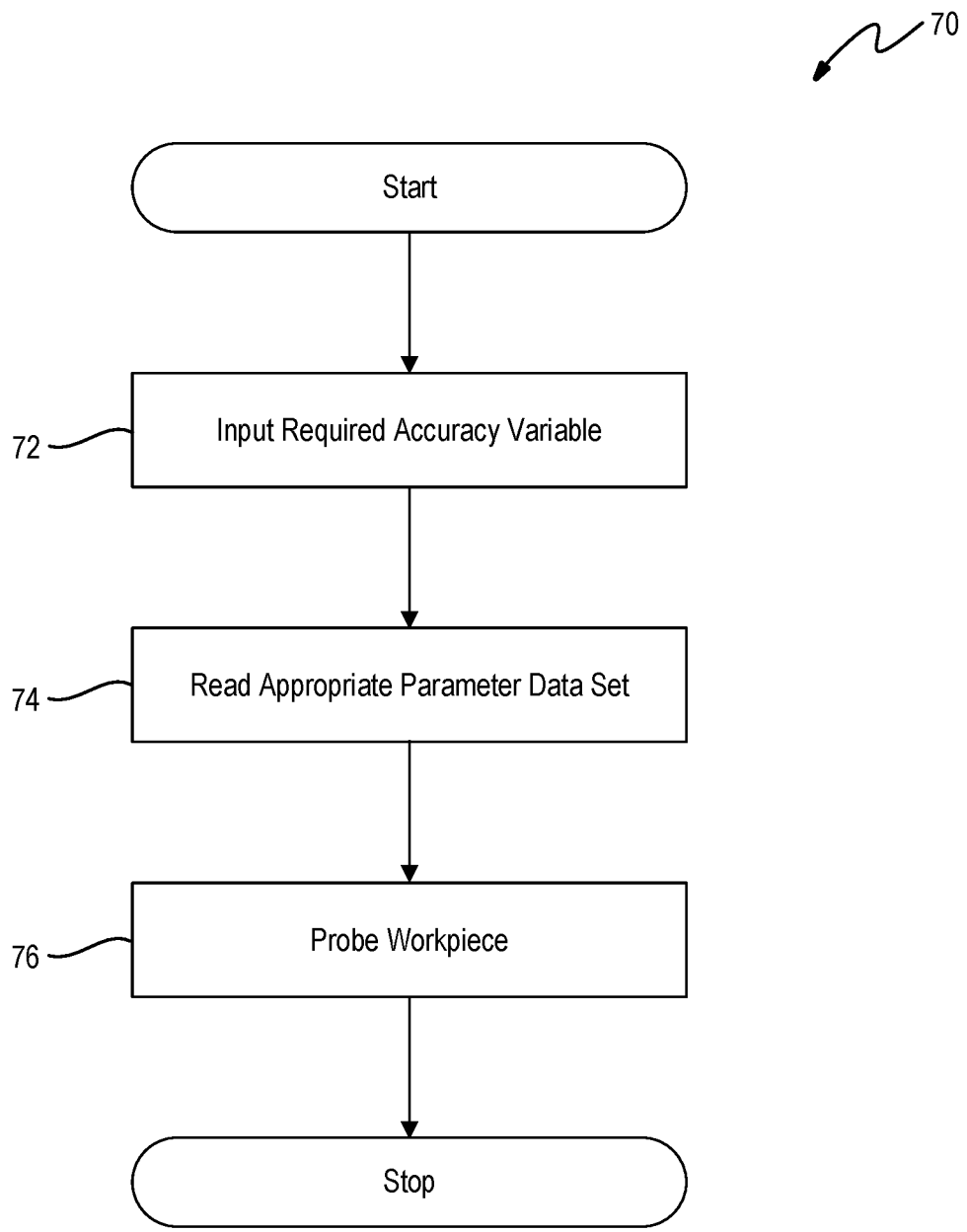
FIG. 3 shows an embodiment of a method.

FIG. 3 shows an embodiment of a method for single-point probing of the workpiece 12 by means of the sensor, in particular a tactile sensor, 16 of the coordinate measuring machine 10. After the start, there is the provision of a variable at least indirectly representing a required accuracy of the single-point probing in a first step 72. By way of example, in the process, the variable representing the accuracy may be input as input data 52 into the data processing device 36 by means of the input device 42. Thereupon, there is the provision of a parameter data set 48, 49 in a step 74, wherein the parameter data set 48, 49 has prescriptions for regulating and/or evaluating the single-point probing with the required accuracy. By way of example, this may be carried out by the data processing device 36 by reading an appropriate parameter data set 48 from the memory 46 in a manner dependent on the input data 52.

This is followed by a step 76 of carrying out the single-point probing of the workpiece 12. In the process, the coordinate measuring machine 10 is regulated on the basis of the provided parameter data set 48. In particular, this is carried out by the regulating device 38.

Then, the single-point probing supplies measurement data 60 which, for example, are evaluated by the data processing device 36, in particular on the basis of the parameter data set 48, and which may be output to a user as output data 50 by way of the indication device 40.

Figure 4:
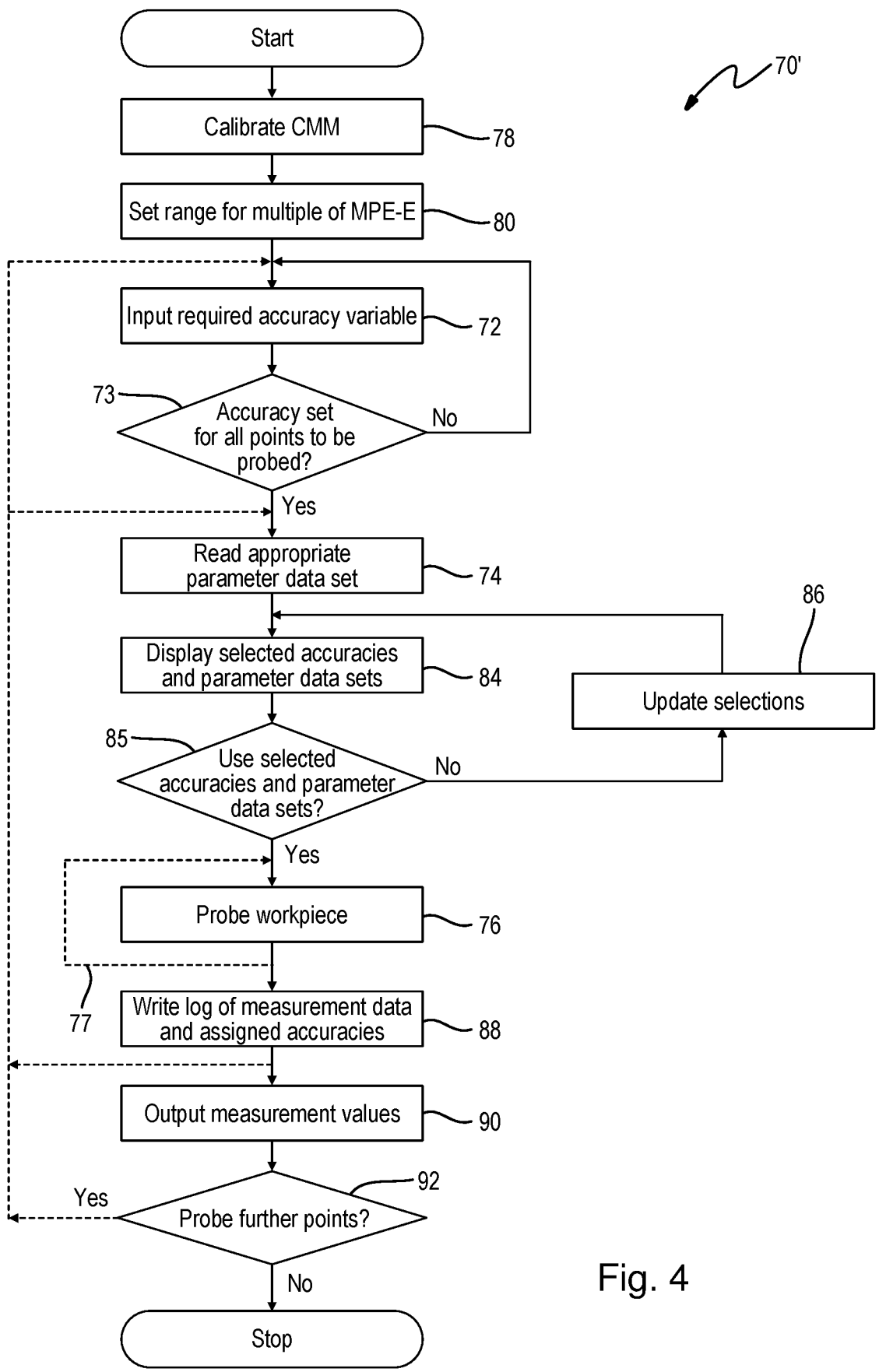
FIG. 4 shows a further embodiment of a method.

FIG. 4 shows a further embodiment of the method 70; the same elements are denoted by the same reference sign. The corresponding method steps are not once again explained in detail below.

Here, as a matter of principle, a step 78 of calibrating the coordinate measuring machine 10 may be carried out at the outset. In so doing, the coordinate measuring machine 10 is operated using a parameter data set 49 which provides high accuracy, preferably a single MPE-E. The method continues with the calibration of the coordinate measuring machine 10 obtained therefrom.

Initially, a range for a multiple of the MPE-E from which a user may predetermine a desired accuracy for single-point probing, for example 1.25×MPE-E, 1.5×MPE-E or 2×MPE-E, is predetermined in a step 80, depending on the type of the coordinate measuring machine or the carrier structure 22 and/or the sensor, in particular the tactile sensor, 16. The required accuracy is then input in step 72. In addition to a manual input, this may, as a matter of principle, also be carried out in an automated manner, for example building on a CAD model of the workpiece 12. If the required accuracy is set in front of a point, a subsequent step 73 queries whether the accuracy was set for all points to be probed. If this is not the case, step 72 of providing the required accuracy is carried out for the next point. If this is the case, the method continues with step 74 of providing the parameter data sets 48, 49 in relation to the corresponding required accuracies.

Thereupon, the provided required accuracies and the parameter data sets ascertained therefrom may be indicated to the user in a step 84. In a step 85, said user may be queried as to whether these parameter data sets may be used. If this is not the case, changing of the parameter data sets by the user and/or updating of the required accuracies may be facilitated in a step 86. Building thereon, there would then be a new indication in step 84. If the user affirms the displayed parameters and the required accuracies in step 85, the single-point probing or instances of single-point probing and/or evaluating of the single-point probing or the instances of single-point probing may be carried out in a step 76. Following this, it is possible to write a log in step 88, where the required accuracies, in particular, are assigned to the measurement data. This facilitates a subsequent evaluation of the measurement data in respect of the underlying required accuracies.

The measurement values may then be output in a step 90. In principle, this may be followed in a step 92 with a query whether further points should in fact be probed; if this is the case, there may be a jump back to in front of step 72 and a further required accuracy may be entered. However, in principle, there may also be a jump back to directly in front of step 74 if there should be no change in the accuracies and the corresponding parameter data sets are provided directly.

In principle, provision may be made in the method 70' for steps 72 to 90 to be run through for each individual measurement point, i.e. for each instance of single-point probing. In this case, the accuracy requirements are stored, parameter data sets are provided and affirmed by the user, and the single-point probing is carried out individually for each point. However, as a matter of principle, it is also possible, as denoted by the loop 77, to carry out the step sequence once from 72 to 85 inclusive and store the accuracy requirements and provide parameter data sets for all points. Then, as denoted by a 77, step 76 is run through a number of times corresponding to the instances of single-point probing at the workpiece 12 to be carried out. Then, indicating and logging 88, 90 may be carried out subsequently. However, a measurement task may also be carried out automatically by a prescription to or by the regulating device. By way of example, the required accuracies may be read automatically from geometry data of a CAD model of the workpiece. This may avoid user queries during a measurement process.

Figure 5:
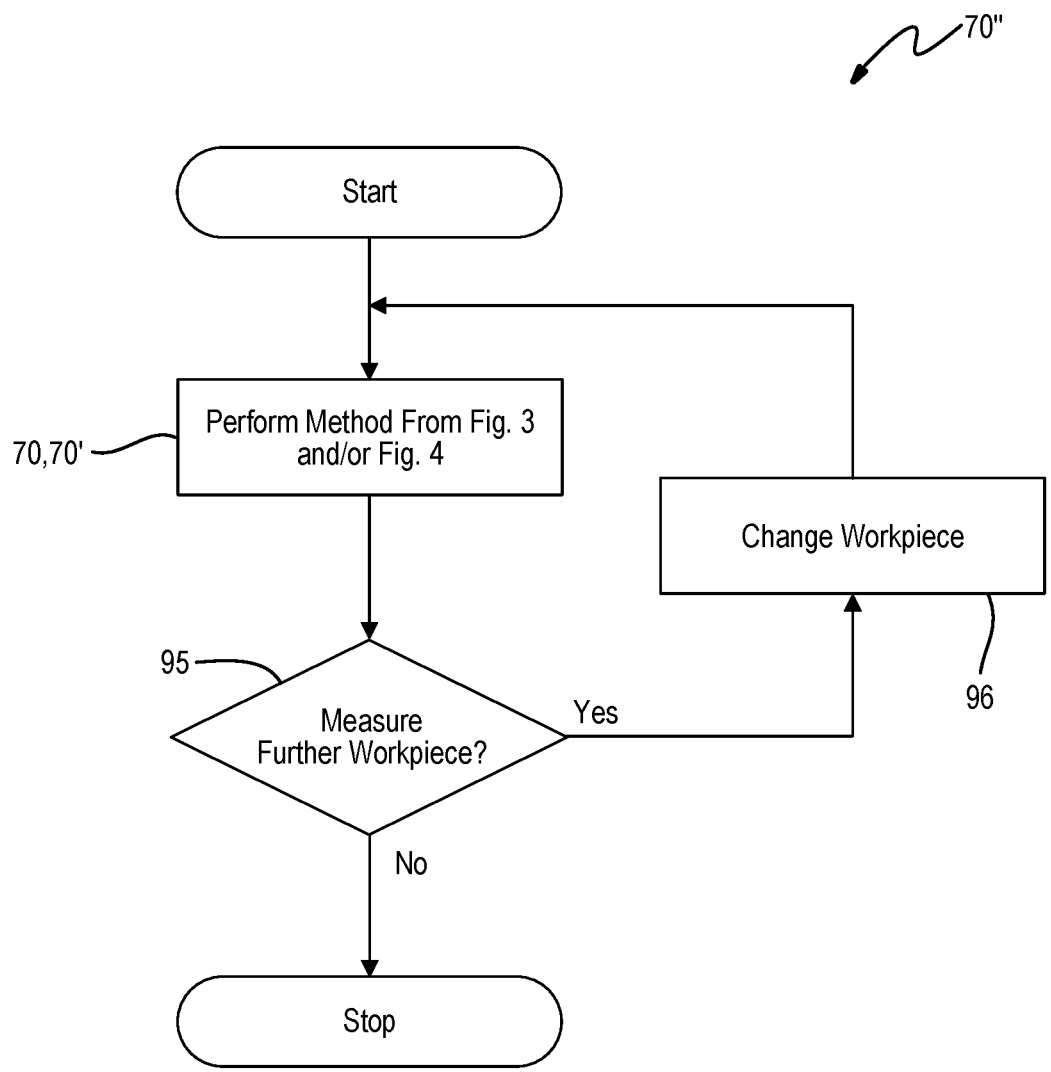
FIG. 5 shows an even further embodiment of a method.

FIG. 5 shows a further embodiment of the method 70". Once the method is started, a method 70, 70' as explained in FIGS. 3 and/or 4 is initially carried out. Subsequently, there is a query in a step 95 whether a further workpiece 12, in particular an identical workpiece 12, should still be measured. If this is the case, the workpiece is changed in a step 96 and the method 70 and/or 70' is carried out anew. If this is not the case, the method ends.

What is claimed is:

1. A method for single-point probing of a workpiece by means of a sensor of a coordinate measuring machine, said method comprising the following steps:

providing a variable at least indirectly representing a required accuracy of the single-point probing;

providing a parameter data set, wherein the parameter data set has prescriptions for regulating and/or evaluating the single-point probing with the required accuracy, wherein the sensor is a measuring sensor, wherein each individual point of probing is determined by forming a moving average over a probing time interval, wherein the parameter data set comprises at least one parameter of forming the moving average, and wherein the at least one parameter of forming a moving average is a duration of the probing time interval, a weighting of the measurement values captured during the probing time interval and/or an accuracy of forming the moving average; and carrying out the single-point probing of the workpiece, wherein the coordinate measuring machine is regulated on the basis of the provided parameter data set and/or an evaluation is carried out on the basis of the provided parameter data set.

2. The method as claimed in claim 1, wherein the sensor is a tactile sensor.

3. The method as claimed in claim 1, wherein the variable representing the required accuracy is provided by virtue of the required accuracy being input by means of an input device of the coordinate measuring machine.

4. The method as claimed in claim 1, wherein the variable representing the required accuracy is a characteristic specifying the accuracy of the coordinate measuring machine.

5. The method as claimed in claim 4, wherein the variable is a multiple of the maximum permissible error during a length measurement.

6. The method as claimed in claim 1, wherein the variable is a variable indirectly specifying the required accuracy and wherein the required accuracy is determined from the variable indirectly specifying the required accuracy.

7. The method as claimed in claim 6, wherein the variable indirectly specifying the required accuracy is a position of the point to be probed on the workpiece or a measurement task.

8. The method as claimed in claim 1, wherein a provision range is predetermined, within which the required accuracy is providable.

9. The method as claimed in claim 8, wherein the provision range is dependent on a type of carrier structure of the coordinate measuring machine and/or a type of sensor.

10. The method as claimed in claim 1, wherein the parameter data set is provided for a shortest time duration of the single-point probing with the required accuracy.

11. The method as claimed in claim 1, wherein the parameter data set is provided dependent on a product type and/or a type of carrier structure of the coordinate measuring machine.

12. The method as claimed in claim 1, wherein the parameter data set is provided dependent on an installation size of the coordinate measuring machine and/or the dimensions of a measurement space of the coordinate measuring machine.

13. The method as claimed in claim 1, wherein the parameter data set comprises a speed and/or an acceleration of a movement of the sensor of the coordinate measuring machine.

14. The method as claimed in claim 1, wherein the sensor is a tactile sensor, and wherein the parameter data set comprises at least one probing parameter for the tactile sensor.

15. The method as claimed in claim 14, wherein the at least one probing parameter is a probing search path, a probing speed, an acceleration during probing, a scan path for a measuring tactile sensor and/or a scan path for a switching tactile sensor.

16. The method as claimed in claim 1, wherein a calibration of the sensor is carried out prior to the step of providing a variable at least indirectly representing the required accuracy of the single-point probing, and wherein the calibration is carried out with a calibration parameter data set which provides the best accuracy of the coordinate measuring machine.

17. The method as claimed in claim 16, wherein the sensor is a tactile sensor, and wherein a calibration of the tactile sensor and/or of a stylus of the tactile sensor is carried out.

18. The method as claimed in claim 17, wherein a resilience of a stylus of the tactile sensor, determined during the calibration, is used when carrying out the single-point probing and/or evaluating the single-point probing.

19. The method as claimed in claim 16, wherein the accuracy of the coordinate measuring machine is a simple MPE-E.

20. A method for single-point probing of a workpiece by means of a sensor of a coordinate measuring machine, said method comprising the following steps:

providing a variable at least indirectly representing a required accuracy of the single-point probing;

providing a parameter data set, wherein the parameter data set has prescriptions for regulating and/or evaluating the single-point probing with the required accuracy; and carrying out the single-point probing of the workpiece, wherein the coordinate measuring machine is regulated on the basis of the provided parameter data set and/or an evaluation is carried out on the basis of the provided parameter data set;

wherein the sensor is a measuring sensor, wherein each individual point of probing is determined by forming a moving average over a probing time interval, and wherein the parameter data set comprises at least one parameter of forming the moving average.

21. The method as claimed in claim 20, wherein the sensor is a measuring tactile sensor.

22. The method as claimed in claim 20, wherein the at least one parameter of forming the moving average is a duration of the probing time interval, a weighting of the measurement values captured during the probing time interval and/or an accuracy of forming the moving average.

23. A coordinate measuring machine for single-point probing of a workpiece, comprising a measuring sensor, a carrier structure for holding the sensor and moving the sensor within a measurement space of the coordinate measuring machine, a regulating device for regulating single-point probing of the workpiece by means of the sensor on the basis of a parameter data set, wherein the parameter data set contains prescriptions for regulating and/or evaluating the single-point probing with a required accuracy, an input device for inputting a variable representing the required accuracy of the single-point probing and a data processing device which provides the parameter data set dependent on the variable representing the required accuracy of the single-point probing, wherein each individual point of probing is determined by forming a moving average over a probing time interval, and wherein the parameter data set comprises at least one parameter of forming the moving average, and wherein the at least one parameter of forming a moving average is a duration of the probing time interval, a weighting of the measurement values captured during the probing time interval and/or an accuracy of forming the moving average.

24. The coordinate measuring machine as claimed in claim 23, wherein the sensor is a tactile sensor, and wherein the tactile sensor is a switching tactile sensor or a measuring tactile sensor.

\* \* \* \* \*

UNITED STATES PATENT AND TRADEMARK OFFICE
CERTIFICATE OF CORRECTION

PATENT NO. : 10,508,895 B2
APPLICATION NO. : 15/437983
DATED : December 17, 2019
INVENTOR(S) : Guenter Grupp et al.

Page 1 of 1

It is certified that error appears in the above-identified patent and that said Letters Patent is hereby corrected as shown below:

On the Title Page

Item (71) Applicant, Line 2    delete "Oberkocken" and insert --Oberkochen--

Page 2, Column 2
Item (56) Other Publications, Line 14    delete "2015" and insert --2016--

Signed and Sealed this
Twenty-fifth Day of February, 2020

Andrei Iancu
*Director of the United States Patent and Trademark Office*